United States Patent

[11] 3,589,019

[72] Inventor Irven H. Culver
 Playa Del Rey, Calif.
[21] Appl. No 783,005
[22] Filed Dec. 11, 1968
[45] Patented June 29, 1971
[73] Assignee Southwestern Industries, Inc.
 Los Angeles, Calif.

[54] AIRCRAFT ATTITUDE-INDICATING INSTRUMENT
 5 Claims, 17 Drawing Figs.

[52] U.S. Cl. .................................................. 33/204
[51] Int. Cl. ............................................. G01c 19/32, G01c 19/44
[50] Field of Search........................................... 33/204.2, 204; 340/27 SS, 27 AT, 27 NA

[56] References Cited
UNITED STATES PATENTS

| | | | |
|---|---|---|---|
| 1,939,825 | 12/1933 | Narvesen et al. | 33/204 (.2) |
| 2,038,531 | 4/1936 | Bassett et al. | 33/204 (.2) |
| 2,415,707 | 2/1947 | Savage | 33/204 (.2) |
| 2,417,720 | 3/1947 | Wendt | 33/204 (.2) |
| 2,489,294 | 11/1949 | Kenyon | 33/204 (.2) |
| 2,563,225 | 8/1951 | Edmonds et al. | 33/204 |

FOREIGN PATENTS

| | | | |
|---|---|---|---|
| 791,315 | 9/1935 | France | 33/204 (.2) |
| 877,780 | 9/1942 | France | 33/204 (.2) |
| 889,337 | 9/1943 | France | 340/27 |
| 349,026 | 5/1931 | Great Britain | 33/204 |

Primary Examiner—Robert B. Hull
Attorney—Christie, Parker & Hale

ABSTRACT: An instrument for displaying pitch-and-roll attitude of an aircraft. A two-degree-of-freedom vertical gyroscope is suspended within a frame or housing, and is connected to an attitude indicator which moves in the same manner with respect to the frame and aircraft instrument panel as the aircraft moves in pitch and roll with respect to the earth. A novel linkage between the gyroscope and indicator transmits both pitch-and-roll position information over a single path to minimize the number of moving parts in the instrument, thereby reducing friction and other errors which affect accuracy and reliability of the attitude display.

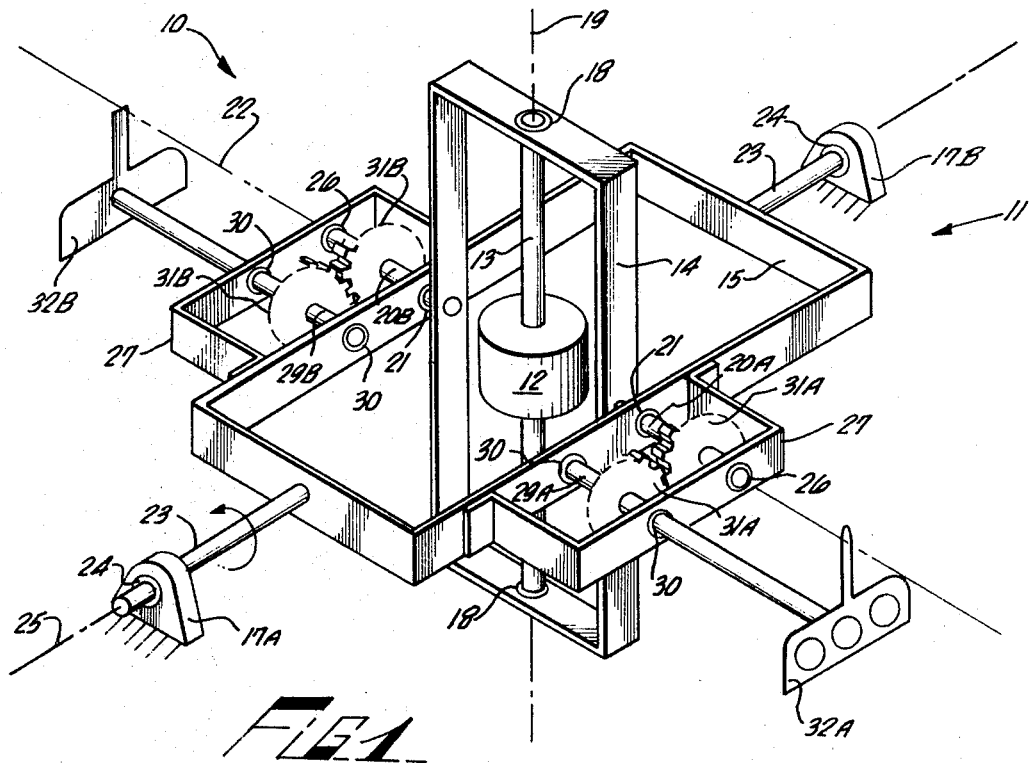

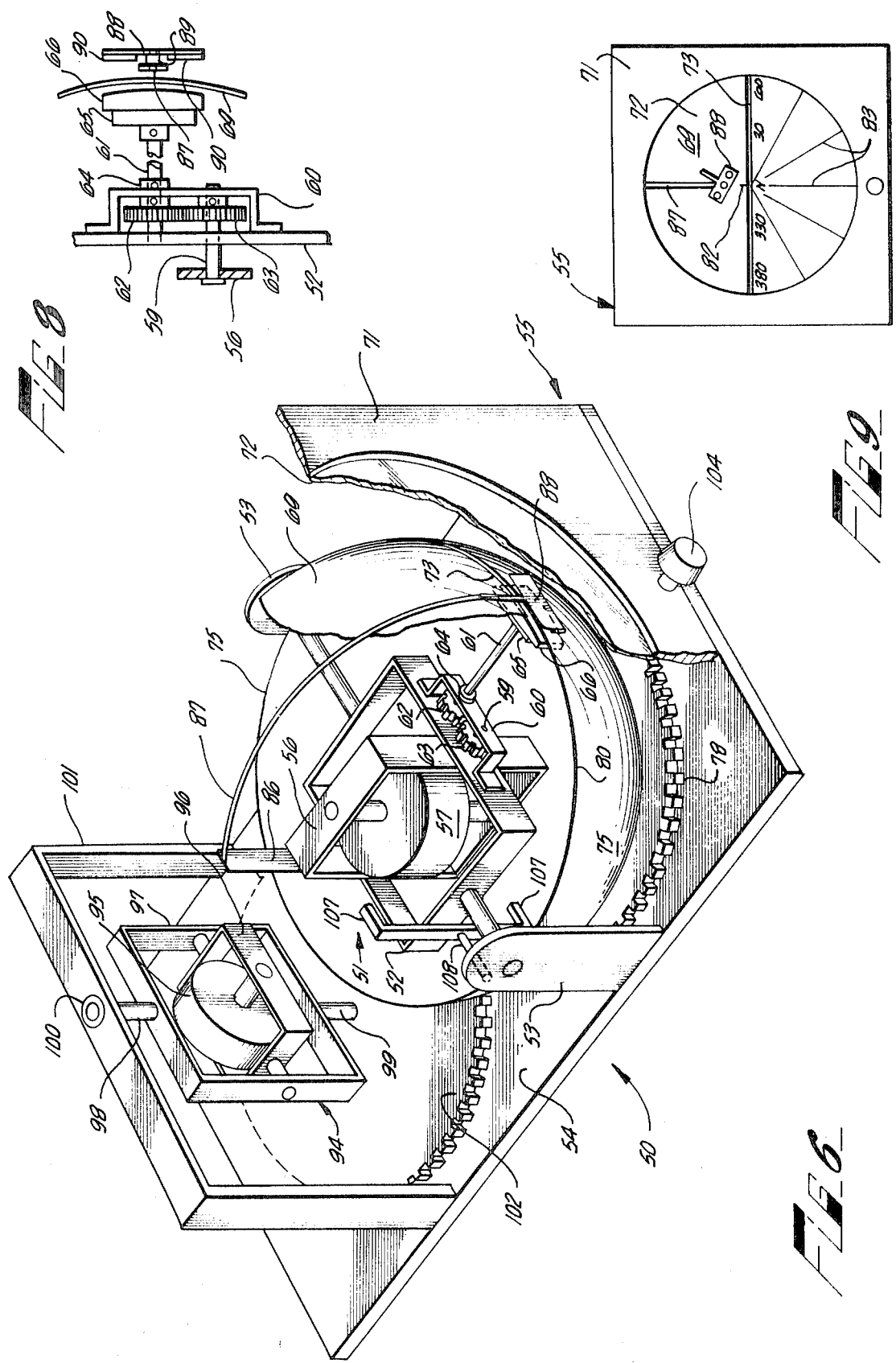

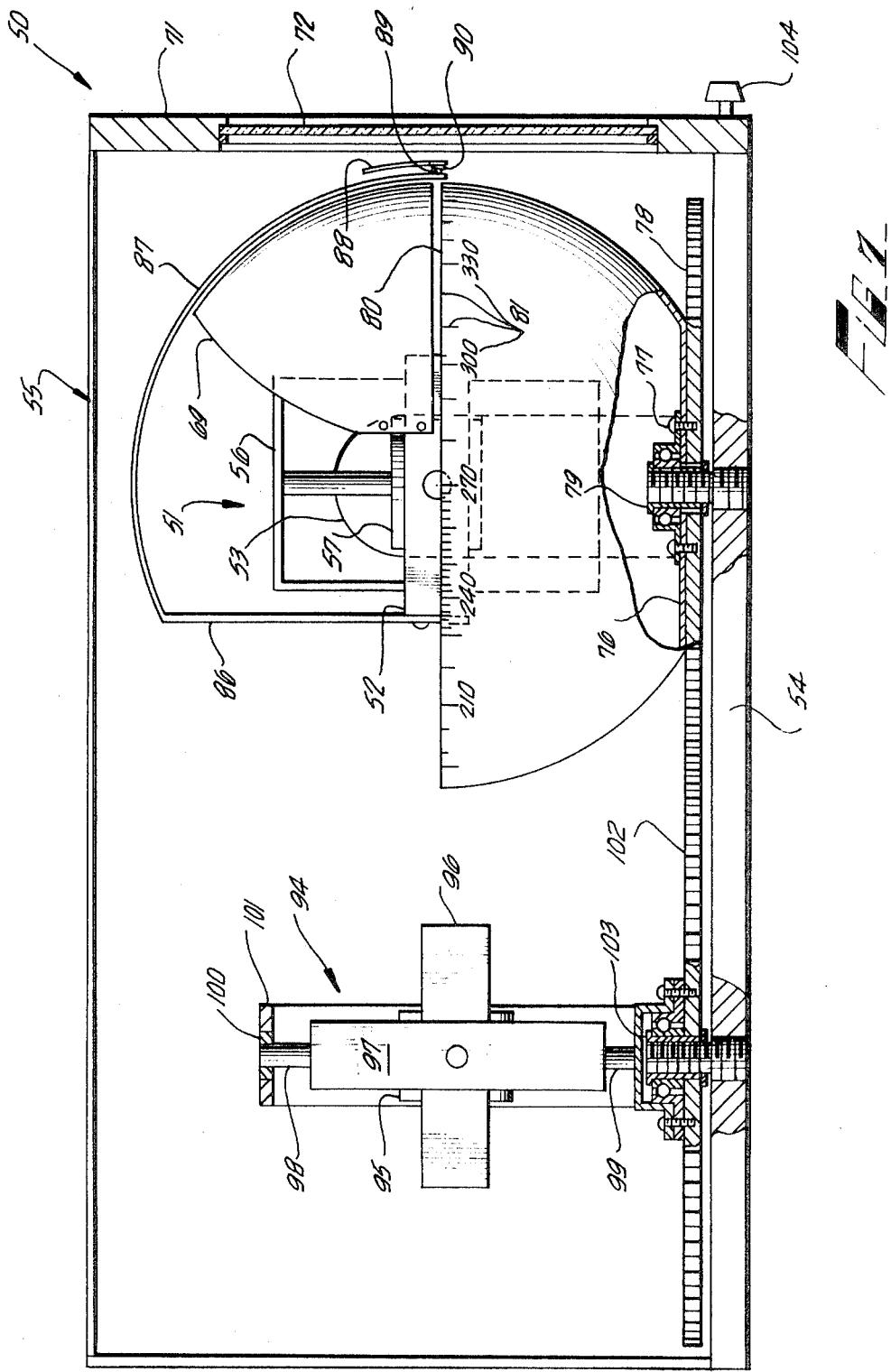

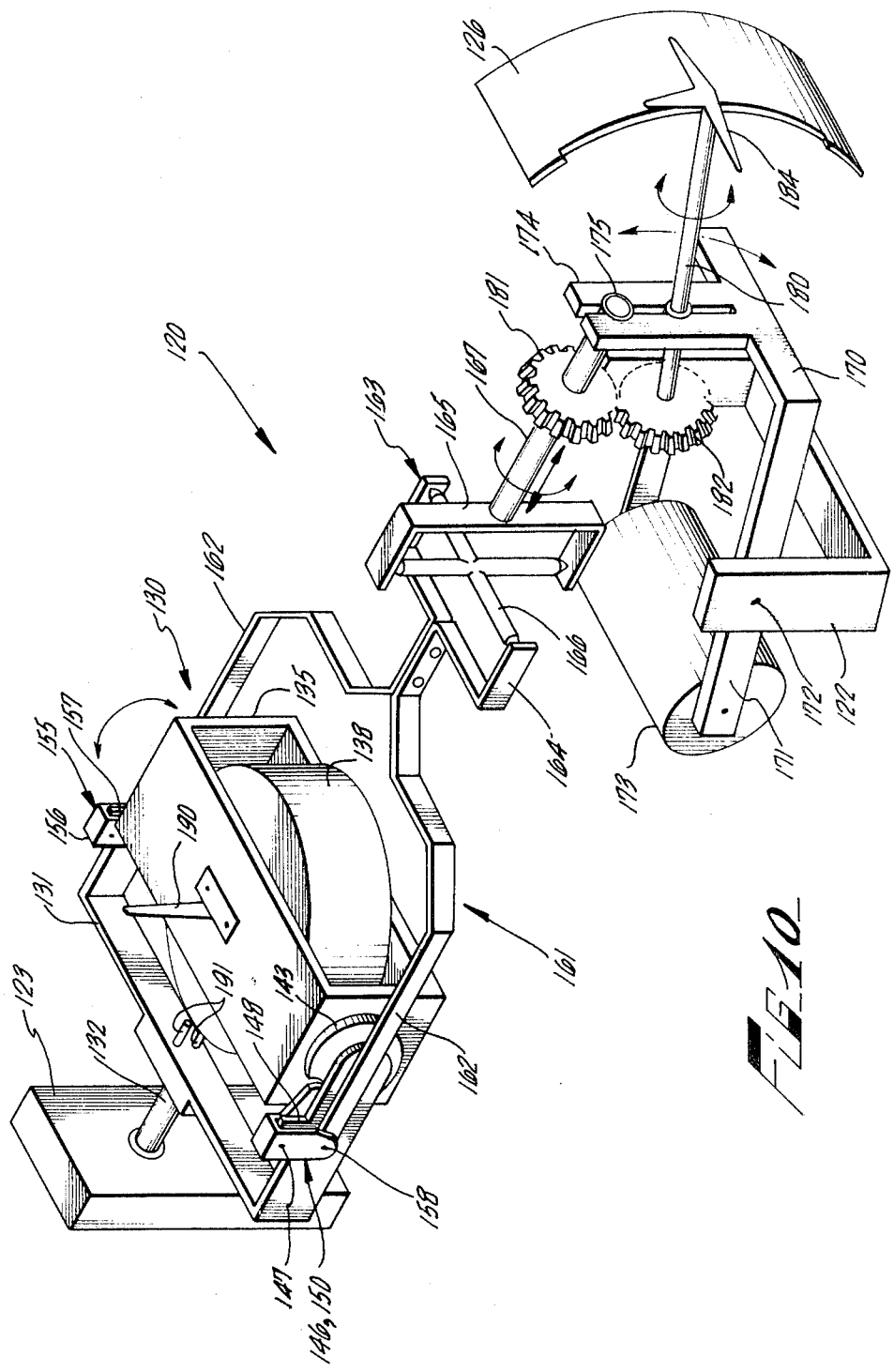

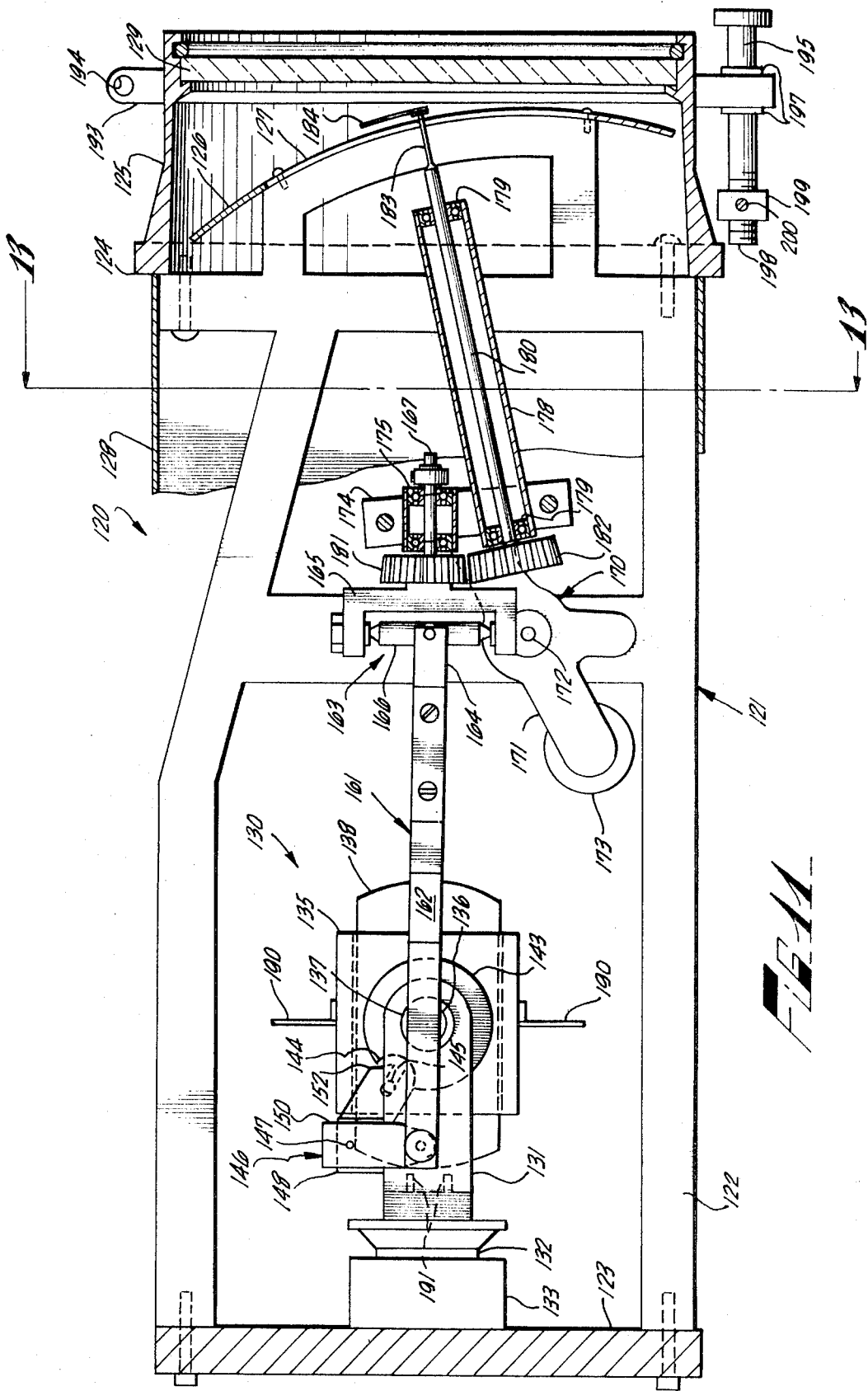

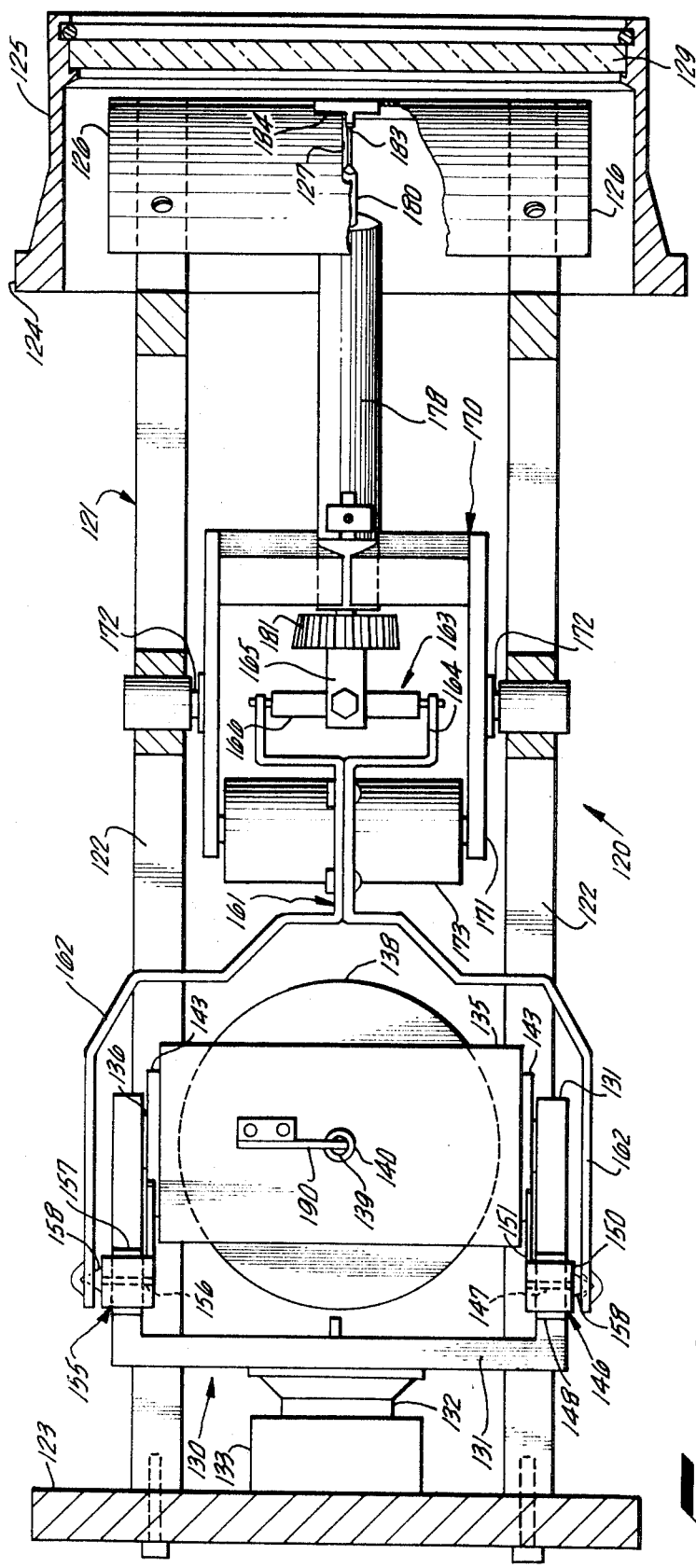
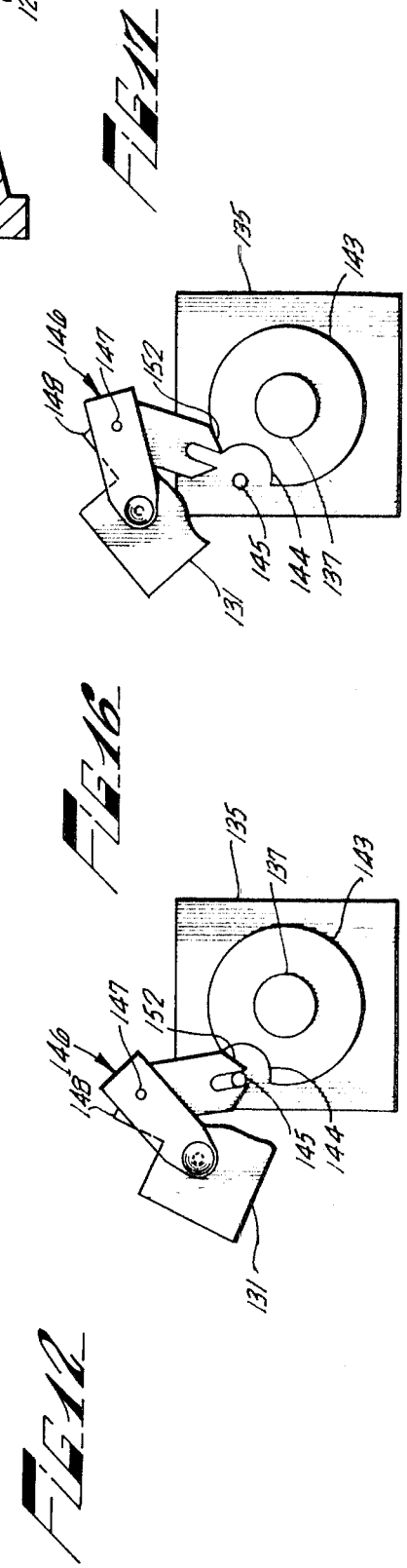
FIG.11
FIG.16
FIG.12

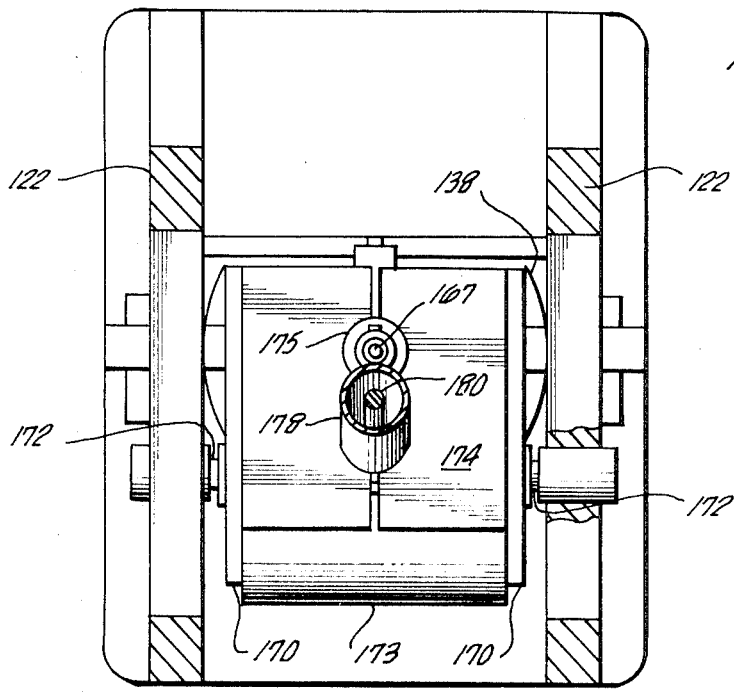
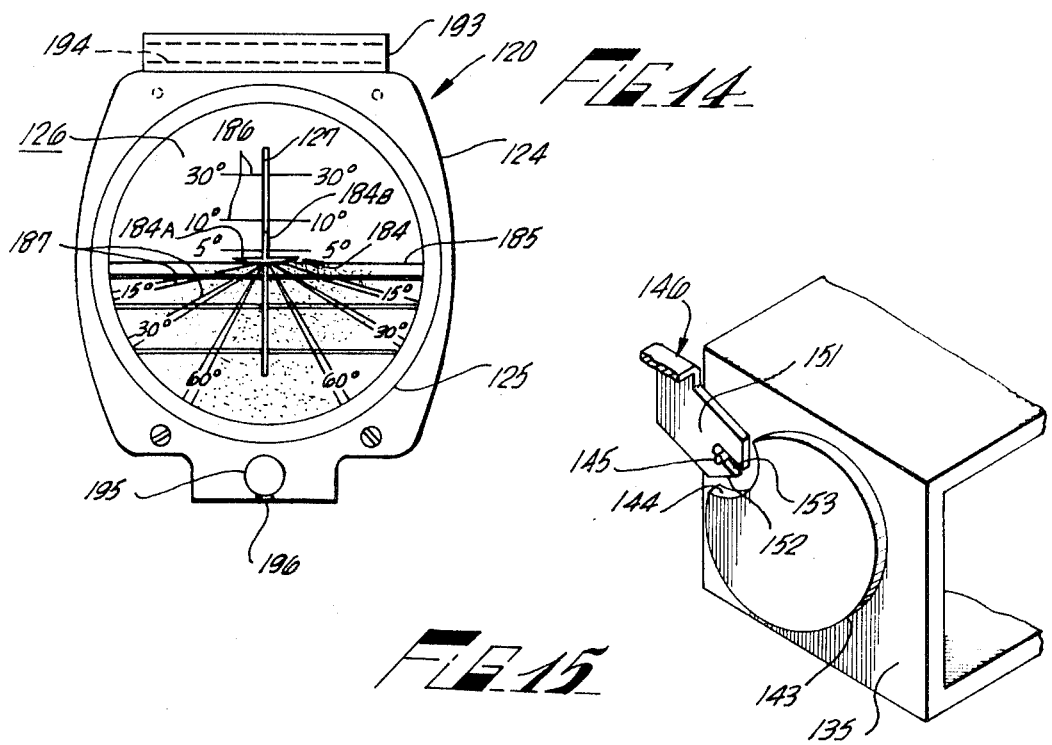

3,589,019

AIRCRAFT ATTITUDE-INDICATING INSTRUMENT

BACKGROUND OF THE INVENTION

Aircraft attitude indicators presently in common use for instrument flying have a gyroscope-stabilized horizon bar which simulates actual horizon position with respect to aircraft pitch-and-roll attitude. Horizon bar motion reflects apparent actual horizon motion (i.e. the bar moves up when the aircraft pitches down, the bar rolls left when the aircraft rolls right, etc.), and pilot disorientation can occur because the pilot senses and thinks of actual aircraft motion rather than an imaginary horizon motion. The pilot's spatial frame of reference becomes the inside of the aircraft cockpit when he cannot see the ground or actual horizon due to clouds, haze, or darkness, and an attitude indicator which moves properly with respect to this frame of reference significantly reduces the risk of disorientation and vertigo. Improved instruments have been proposed with indicators which move in the same sense as the aircraft itself moves, but these instruments have been of complex construction which is expensive and difficult to produce and maintain. The attitude indicator of this invention is of relatively simple construction with a minimum of linkage components between gyro and indicator, and it provides an attitude display which is instinctively interpreted correctly by the pilot.

SUMMARY OF THE INVENTION

Briefly stated, the invention contemplates an improvement in an aircraft attitude-indicating instrument having a stabilized attitude-reference means such as a vertical gyroscope against which roll-and-pitch attitude of the aircraft is measured. The gyro is of a conventional type having a first gimbal rotatable about an axis parallel to the aircraft pitch axis, and a second gimbal rotatable about an axis parallel to the aircraft roll axis. The gyro is carried by a frame adapted for mounting in an aircraft, and a horizon panel having a reference line thereon is also mounted on the frame. An attitude indicator is positioned for viewing against the horizon panel to display pitch-and-roll attitude of the aircraft.

In a presently preferred form of the invention, the coupling means includes a lost-motion linkage which limits pitch response of the indicator to an aircraft pitch range of about ±35° from level flight. For aircraft pitch attitudes beyond this normal operating range, the pitch indicator dwells in a climb-limit or dive-limit position in order to remain visible to the pilot for continuous presentation of roll attitude.

Preferably, the universal joint has a center of action which, when the instrument is in a level pitch attitude, lies substantially in a plane containing the bracket axis and normal to the outer-gimbal axis.

BRIEF DESCRIPTION OF THE DRAWINGS

FIG. 1 is a perspective schematic view of a first form of an attitude-indicating instrument according to the invention;

FIG. 2 is a side elevation of a portion of the first form of the invention;

FIG. 3 is a perspective view of the instrument shown in FIGS. 1 and 2 as mounted in a case;

FIG. 4 is a front view of the instrument showing the position of an attitude-indicating indicator when the aircraft is in a level right turn;

FIG. 5 is a view similar to FIG. 4 showing the position of the indicator when the aircraft is in a diving left turn;

FIG. 6 is a perspective semischematic view of a second form of the invention which displays azimuth information along with pitch-and-roll attitude of the aircraft;

FIG. 7 is a side elevation, partly broken away and in section, of the instrument shown in FIG. 6;

FIG. 8 is a top view of an indicator and coupling mechanism as used in the instrument shown in FIG. 6;

FIG. 9 is a front view of the instrument shown in FIG. 6;

FIG. 10 is a perspective semischematic view of a presently preferred form of an instrument according to the invention;

FIG. 11 is a side elevation, partly broken away and in section, of the presently preferred instrument;

FIG. 12 is a top view, partly broken away, of the presently preferred instrument;

FIG. 13 is a view on line 13-13 of FIG. 11;

FIG. 14 is a front view of the presently preferred instrument;

FIG. 15 is a perspective view of a Geneva mechanism used in the instrument shown in FIGS. 10-14;

FIG. 16 is an elevation showing another position of the Geneva mechanism; and

FIG. 17 is an elevation showing a third position of the Geneva mechanism.

DESCRIPTION OF THE PREFERRED EMBODIMENTS

A first form of an attitude-indicating instrument 10 incorporating certain features of the invention is shown in FIGS. 1-5, and its operation is best explained in terms of the schematic view in FIG. 1. Referring to FIG. 1, the instrument includes a two-degree-of-freedom vertical gyroscope 11 having a rotor 12, rotor-supporting shaft 13, inner gimbal 14, and outer gimbal 15. The vertical gyro is supported within an instrument case 17 (represented schematically in FIG. 1 by a pair of brackets 17A and 17B) adapted for mounting in an instrument panel of an aircraft.

Rotor-supporting shaft 13 of the gyro is rotatably supported in bearings 18 carried by inner gimbal 14, and defines a rotor axis of rotation 19 which is vertical with respect to the earth. Inner gimbal 14 is supported by a pair of shafts 20A and 20B rigidly secured to and extending from opposite sides thereof, the shafts being rotatably journaled through bearings 21 in outer gimbal 15. The inner gimbal has an axis of rotation 22 which is parallel to a roll axis of the aircraft, and perpendicular to the rotor axis of rotation.

The outer gimbal is similarly supported by a pair of trunnions or shafts 23 secured to and extending from opposite sides thereof to be journaled through bearings 24 in brackets 17A and 17B of the instrument case. The outer gimbal has an axis of rotation 25 which is parallel to a pitch axis of the aircraft and perpendicular to the axis of rotation of the inner gimbal.

Vertical gyro 11 as thus far described is of a conventional type as used in known artificial-horizon instruments. The gyro rotor is spun by an electric motor (not shown) or an airstream maintained by an external pump (not shown). A conventional erection system (not shown) is also provided on the gyro inner gimbal to maintain the rotor spin axis in a vertical position with respect to the earth. The rotor-spinning mechanism and the erector system are conventional components, and are omitted in the drawings for clarity of illustration.

The outer ends of inner-gimbal shafts 20A and 20B extend beyond outer gimbal 15 and are rotatably supported in bearings 26 carried by brackets 27 secured to the outer gimbal. A pair of output shafts 29A and 29B extend from opposite sides of the outer gimbal parallel to inner-gimbal shafts 20A and 20B. Output shafts 29A and 29B are supported in bearings 30 carried by the outer gimbal and brackets 27. A pair of spur gears 31A are secured to shafts 20A and 29A to couple the shafts together rotationally. Shafts 20B and 29B are similarly rotationally coupled by a pair of spur gears 31B.

Rotation of the outer gimbal around the inner-gimbal axis of rotation (as occurs when the aircraft banks away from a wings-level attitude) thus results in a corresponding rotation of output shafts 29A and 29B. A pair of indicators 32A and 32B are secured at the ends of output shafts 29A and 29B respectively. The indicators are shaped and marked to resemble an aircraft instrument panel and windshield center post to simulate the view presented to the pilot as he sits in the aircraft.

FIGS. 2 and 3 show vertical gyro 11 mounted in case 17 with indicator 32A being visible through a window 35 in a front panel 36 of the case. A pair of curved horizon panels 37 and 38 are slidably supported in slots 39 formed partially through sidewalls 40 of the case. Panels 37 and 38 and slot 39 are cylindrically curved around an axis corresponding to outer-gimbal axis of rotation 25. The horizon panels are slightly separated at their adjacent edges to define a slot 41 through which output shaft 29A extends. The panels are secured together above and below window 35 by a pair of curved brackets 42 which extend outwardly from the horizon panels so indicator 32A can pass between the horizon panels and the curved brackets.

Markings on horizon panels 37 and 38 define an attitude index or simulated horizon line 44 parallel to the pitch axis of the aircraft. The area of the panels visible through window 35 above horizon line 44 is preferably colored a light blue or gray to simulate the sky. The area of the panels below the horizon line is darker in color, and is preferably brown or black to simulate the earth. An arm 46 is secured to horizon panel 38 and extends through a slot 47 in the front panel of the case. Movement of the arm along the slot causes the horizon panels to slide up or down in slots 39 to provide a vertical adjustment of the position of horizon line 44.

In operation, the gyro rotor is brought up to speed and established on a vertical rotational axis with respect to the earth by the gyro erecting system (not shown). This vertical spin axis is stable in space, and is isolated from motions of the case by the inner and outer gimbals as the aircraft pitches or rolls. With the aircraft in a level-flight attitude, the position of the horizon panels is adjusted by moving arm 46 until horizon line 44 has a desired relationship to indicator 32A. For example, as shown in FIG. 3, the horizon line can be adjusted to be level with the bottom of the simulated instrument panel on the indicator.

If the aircraft now rolls to the right, the instrument case and outer gimbal 15 correspondingly roll around the inner-gimbal axis of rotation. This motion, however, is isolated from the gyro rotor by the gimbal system, and the rotor and inner gimbal remain stationary in space. The resulting relative rotation between the inner and outer gimbals causes a clockwise rotation (as viewed from the front of the instrument) of output shaft 29A. That is, the gear on the output shaft rolls around the stationary gear on shaft 20A, and the output shaft is thereby rotated within bearings 30. Indicator 32A is accordingly rotated clockwise or to the right as suggested in FIG. 4 which shows the appearance of the instrument when the aircraft is in a level right turn. A roll to the left would of course produce a counterclockwise rotation of the output shaft and indicator.

The gyro rotor is similarly isolated from motions of the aircraft about its pitch axis. For example, if the aircraft assumes a diving attitude, outer gimbal 15 remains stationary in space, and the instrument case rotates around outer-gimbal shafts 23. Indicator 32A is stable in space during this maneuver as it is secured to the outer gimbal, but movement of the instrument case and horizon panels 37 and 38 are manifested by an apparent downward movement of the indicator with respect to the horizon panels as shown in FIG. 5. In this figure, the indicator is displaying an aircraft attitude corresponding to a diving or descending left turn with the aircraft nose well below the horizon and the wings banked to the left with respect to the horizon.

This presentation is entirely natural to the pilot as the indicator behaves with respect to the horizon panels in exactly the same fashion as the aircraft behaves with respect to the actual horizon. As the aircraft banks to the right, the indicator rotates to the right. As the aircraft nose is raised above the actual horizon to assume a climbing attitude, the indicator rises above the simulated horizon on the horizon panels. The instrument is thus easily and immediately interpreted by the pilot without the difficulty normally encountered in interpreting a conventional artificial-horizon instrument in which apparent horizon motion rather than actual aircraft motion is displayed.

Output shaft 29B, spur gears 31B, and indicator 32B are included in the instrument to provide the pilot with a presentation of roll-and-pitch attitude when the aircraft is inverted. For example, if the aircraft is flown through an inside loop, indicator 32A will disappear past the top of window 35 after the aircraft exceeds a climbing pitch attitude of about 30°. The indicator is of course stationary in pitch, but the aircraft case and the aircraft itself are rotating around the outer-gimbal axis of rotation such that the indicator appears to move upwardly in the window. As the aircraft approaches an inverted attitude, indicator 32B appears at the bottom of the window and moves upwardly to cross the horizon line when the aircraft is at the top of the loop.

Any deviation from a wings-level attitude in the inverted position will be correctly displayed by indicator 32B, but the indicator will appear inverted in the window to show the pilot that the aircraft is in fact inverted with respect to the actual horizon. Output shaft 29B, gears 31B, and indicator 32B can be deleted from the attitude-indicating instrument if the capability of attitude presentation in acrobatic flight is not needed. If these components are deleted, conventional pitch stops can be installed such that indicator 32A is limited in its apparent motion to, say, ±30° in pitch so the pilot will have a constant indication of roll attitude in even extreme pitch positions.

A second device embodying certain features of the invention is shown in FIGS. 6—9 which depict an attitude/azimuth-indicating instrument 50. This instrument is similar to attitude-indicating instrument 10 in its overall presentation of roll-and-pitch attitude, but has the further feature of indicating the azimuth or heading of the aircraft. Instrument 50 is essentially a somewhat modified version of instrument 10 to which a gyroscopic compass has been added. The illustrations of instrument 50 are semischematic in nature, and conventional components such as erecting systems and rotor-spinning means have been omitted in order to illustrate the novel features of the invention with maximum clarity.

Instrument 50 includes a vertical gyro 51 of the same type as vertical gyro 11 already described. Gyro 51 includes an outer gimbal 52 rotatably mounted between a pair of brackets 53 secured to a baseplate 54 of a case 55 which encloses the instrument. Gyro 51 also has an inner gimbal 56 rotatably mounted on the outer gimbal, and a rotor 57 rotatably mounted on the inner gimbal to spin about a vertical axis. The instrument case is arranged for mounting in an aircraft such that the outer-gimbal axis of rotation is parallel to the aircraft pitch axis, and the inner-gimbal axis of rotation is parallel to the aircraft roll axis.

Referring to FIGS. 6 and 8, one side of the gyro inner gimbal is supported by a shaft 59 rigidly secured to the inner gimbal and rotatably journaled through outer gimbal 52. The outer end of shaft 59 is supported by a bracket 60 secured to the outer gimbal in the same fashion as bracket 27 of instrument 10 described above. An output shaft 61 is rotatably journaled through the outer gimbal and bracket 60 and has a spur gear 62 secured thereto which meshes with a second spur gear 63 secured to inner-gimbal shaft 59.

A collar 64 restrains output shaft 61 against axial motion with respect to bracket 60 and the outer gimbal. A rectangular plate 65 is secured at the outer end of the output shaft, and an elongated bar magnet 66 is rigidly mounted on plate 65. The magnet extends perpendicularly to the axis of output shaft 61 and the axis of rotation of the inner gimbal. The magnet is positioned on the output shaft to be horizontal when the aircraft is in level flight and the outer gimbal axis of rotation is horizontal.

An upper horizon panel 69 is secured to and extends between brackets 53. Panel 69 is spherically curved about a center defined by the intersection of the axes of rotation of the inner and outer gimbals of the gyro. The panel is positioned slightly radially outboard of bar magnet 66 so the horizon panel is close to but freely movable over the gyro-stabilized magnet when the aircraft maneuvers in pitch. As suggested in FIG. 8, magnet 66 is slightly curved on its front surface to follow the contour of the upper horizon panel.

Instrument case 55 includes a front panel 71 having a circular window 72 mounted therein. Upper horizon panel 69 is visible through the window as shown in FIG. 9, and a flat lower edge 73 of the horizon panel simulates the junction of earth and sky in the actual horizon, and is thus a pitch-axis index or reference for a level-flight attitude of the aircraft. Preferably, the surface of the upper horizon panel visible through window 72 is finished in a light color such as white or light blue to make apparent to the pilot that this surface simulates the sky portion of the horizon.

A lower horizon panel 75 is formed as a generally hemispherical shell with a flat bottom portion 76 secured by screws 77 to the upper surface of a gear 78. The gear is rotatably mounted on baseplate 54 by a central shaft 79. The lower horizon panel and gear thus rotate about an axis of rotation which is aligned with the rotor spin axis and is perpendicular to the axes of rotation of the gyro inner and outer gimbals.

An upper edge 80 of lower horizon panel 75 terminates just short of lower edge 73 of the upper horizon panel. The upper and lower horizon panels are aligned spherically as shown in FIGS. 6 and 7, and the lower horizon panel has a center of curvature which is coincident with the center of curvature of the upper horizon panel. Bar magnet 66 is thus slightly inwardly spaced from both the upper and lower horizon panels, and can rotate within these panels about the outer-gimbal axis of rotation.

Positioned just below upper edge 80 of the lower horizon panel are a series of markings 81 defining a compass scale of 360°. These markings are visible through window 72, and the heading of the aircraft is determined by matching the compass scale against a stationary azimuth index or lubber line 82 on the upper horizon panel. The lower horizon panel is preferably finished in a relatively dark color to simulate an earth portion of an actual horizon, and this effect may be heightened by adding perspective lines 83 to the panel.

An arm or strut 86 is secured to and extends upwardly from outer gimbal 52. The strut has a forwardly extending portion 87 which is circularly curved around the outer-gimbal axis of rotation as best seen in FIG. 7. An indicator 88 is rotatably mounted on a pin 89 secured to the end of the forwardly extending portion of the strut. Indicator 88 is similar in shape and appearance to indicators 32A and 32B described above. Pin 89 which supports the indicator 88 is positioned so the indicator is rotatable around the axis of rotation of the gyro inner gimbal. A pair of bar magnets 90 are rigidly secured to a rear surface of indicator 88.

The purpose of magnets 66 and 90 is to transmit rotary movement of output shaft 61 to indicator 88, while at the same time avoiding a mechanical linkage between the output shaft and the indicator which would interfere with free rotation of lower horizon panel 75. The axes of rotation of magnets 66 and 90 are in alignment as shown in the drawings, and this alignment is maintained because both output shaft 61 and pin 89 are mounted on the outer-gimbal ring. Magnets 66 and 90 are separated only by upper and lower horizon panels 69 and 75, and by a slight clearance space on each side of the panels. Relatively small bar magnets are quite adequate to provide a torque coupling such that rotation of the output shaft is accurately tracked by indicator 88.

A directional gyroscope 94 of a conventional two-degree-of-freedom type is mounted in case 55 behind vertical gyro 51, and is used to provide an azimuth or aircraft-heading indication in the instrument. Gyro 94 has a rotor 95 with a horizontal spin axis. The rotor is rotatably mounted in an inner gimbal 96 which is in turn rotatably carried by an outer gimbal 97.

The outer gimbal of directional gyro 94 is supported by an upper shaft 98 and a lower shaft 99 rigidly secured to and extending from the upper and lower sides of the gimbal. Upper shaft 98 is rotatably journaled through a bearing 100 carried by a bracket 101 secured to baseplate 54 of the instrument case. Lower shaft 99 is rigidly secured to a gear 102 which is rotatably mounted on baseplate 54 by a shaft 103. The outer gimbal thus has an axis of rotation which is parallel to a yaw axis of the aircraft in which the instrument is mounted. Gears 78 and 102 are meshed, and are of equal size such that a rotation of one of the gears produces an equal and opposite rotation of the other gear.

Directional gyro 94 has a conventional caging mechanism (not shown) controlled by a caging knob 104 extending from the front panel of the instrument. When the caging knob is pushed in toward the instrument front panel, inner gimbal 96 is locked in a position which places the rotor spin axis parallel to the baseplate of the instrument. Rotation of the caging knob then causes rotation of outer gimbal 97 and gear 102 to permit adjustment of lower horizon panel 75 so markings 81 display the actual magnetic heading of the aircraft. This type of caging mechanisms is well known and in common use on directional gyroscopes, and, for brevity, is not described or illustrated in detail.

In operation, indicator 88 provides an indication of aircraft roll-and-pitch attitude in generally the same fashion as described above with reference to instrument 10. The indicator is stabilized in space, but appears to the pilot to move up and down as the aircraft changes its pitch attitude, and to rotate as the wings of the aircraft are banked. The rotation reversal provided by spur gears 62 and 63 drives the indicator in rotation in a direction corresponding to actual aircraft roll. For example, the indicator position shown in FIG. 9 indicates to the pilot that the aircraft is in a climbing pitch attitude with the wings banked to the right.

Directional information is provided to the pilot on lower horizon panel 75 which appears to rotate past lubber line 82 as the aircraft turns. Actually the aircraft is of course rotating around the stabilized lower horizon panel which is held at constant azimuth by the directional gyro. The pilot is thus able to see at a glance not only the pitch-and-roll roll attitude of the aircraft, but also the heading of the aircraft. The rate of apparent rotation of the lower horizon panel provides an indication of the turn rate of the aircraft.

The direction of apparent rotation of the lower horizon panel is opposite to the apparent rotation of a compass card in a conventional directional gyro. For example, as the aircraft turns to the right, the heading markings on the lower horizon panel appear to move to the left past the lubber line. This motion is naturally and easily interpreted by the pilot as it corresponds to what the pilot sees if he observes the earth during visual flight conditions.

Conventional stops are provided on vertical gyro 51 to limit the apparent motion of indicator 88 so the indicator is always visible through window 72 in extreme pitch attitudes. This pitch-limiting action can be provided by a pair of tabs 107 carried by an arm 108 secured to one of brackets 53 which support the outer gimbal. Tabs 107 are positioned to abut the outer gimbal when the aircraft is in a diving or climbing attitude in excess of about 30° from level flight.

A third device which embodies the claimed invention in the presently preferred form of an attitude-indicating instrument 120 is illustrated in FIGS. 10—17. The instrument includes a frame 121 having a pair of apertured sideplates 122 rigidly secured to and extending between a rear plate 123 and a front plate 124. A hollow cylindrical shield 125 extends forwardly from front plate 124, and a cylindrically curved horizon panel 126 is secured within the shield to the front of the sideplates. The horizon panel defines a central, vertically extending slot 127. An outer housing or cover panel 128 extends around frames 121 between plates 123 and 124 to enclose the interior of the instrument. A window 129 is secured within shield 125 ahead of the horizon panel to seal the instrument.

A vertical gyroscope 130 includes a yoke-shaped outer roll gimbal 131 having a trunnion or shaft 132 rigidly secured thereto. Shaft 132 extends rearwardly from the outer gimbal, and is rotatably journaled through a bearing 133 secured to rear plate 123. When the instrument is mounted in an aircraft, shaft 132 is oriented parallel to the fore-and-aft axis of the aircraft so the outer-gimbal axis of rotation is parallel to the aircraft roll axis.

An inner pitch gimbal 135 is rotatably supported within the outer gimbal by a pair of shafts 136 carried by bearings 137 on the outer gimbal. A gyro rotor 138 is carried by a shaft 139 rotatably journaled through bearings 140 carried by the inner gimbal. A rotor-spinning mechanism for the rotor may be of either an electrical or pneumatic type, and is omitted in the drawings for clarity. Also omitted in the drawings is a conventional erecting system used to maintain the rotor spin axis in a vertical position with respect to the earth.

A raised cylindrical boss 143 extends from each side surface of inner gimbal 135 toward the adjacent outer gimbal. Boss 143 has a semicircular notch 144 therein, and a crankpin 145 is secured to the inner gimbal radially outwardly of the notch and boss. A crank member 146 is pivotally secured by a pivot pin 147 mounted through an upwardly extending flange 148 integrally formed with the outer gimbal.

Crank member 146 has an outer arm 150 extending downwardly from pivot pin 147 on the outside of the outer gimbal, and an inner arm 151 extending downwardly and forwardly from the pivot pin between the inner and outer gimbals. An end 152 of the inner arm remote from pivot pin 147 is tapered, and has an elongated slot 153 in which crankpin 145 is free to slide as best seen in FIGS. 15—17. These components will be recognized as one form of the familiar Geneva mechanism for converting rotary motion (of the outer gimbal around the inner gimbal) to a translation of the crank arm. As explained in greater detail below, this mechanism functions as a nonlinear or lost-motion linkage which causes translation of the arms for a portion of the total rotary motion between the inner and outer gimbals, and holds the crank arms stationary in a "dwell" position during the remainder of the rotary motion.

A second crank member 155 is pivotally supported by a pivot pin 156 mounted in a flange 157 extending upwardly from a side of the outer gimbal opposite flange 148. Crank member 155 is identical to crank member 146, and forms part of a second Geneva mechanism on the inner gimbal. A pair of pivot pins 158 are respectively secured at the lower end of outer arm 150 of crank member 146, and at the lower end of the outer arm of second crank member 155.

A yoke member 161 has a pair of laterally spaced rearwardly extending arms 162 carried at their ends on pivot pins 158. A universal-joint assembly 163 is mounted at the front end of yoke member 161, and includes a rear yoke 164 and a front yoke 165. Yokes 164 and 165 are pivotally interconnected by a pair of perpendicularly extending pins 166 which are secured together at their centers. Rear yoke 164 is rigidly secured at the forward end of yoke member 161, and front yoke 165 is carried by an input shaft 167 secured to and extending forwardly therefrom.

An indicator-supporting bracket 170 has a pair of rearwardly extending legs 171 pivotally secured to sideplates 122 by pivot pins 172. A counterweight 173 extends between legs 171 rearwardly of pivot pins 172. Legs 171 are joined at their front ends by an upwardly extending portion 174 formed by a pair of blocks secured together by screws and carrying a bearing 175 through which shaft 167 is rotatably journaled. A tube 178 (omitted in FIG. 10 for clarity) is rigidly secured to upwardly extending portion 174 of the indicator-supporting bracket. Tube 178 carries a pair of bearings 179 at its opposite ends, and an output shaft 180 is rotatably supported by the bearings. The axis of rotation of shaft 180 is upwardly inclined at an angle of about 10° to the axis of rotation of shaft 167 as best seen in FIG. 10. The pilot's head is usually higher in the cockpit than the instrument panel, and the upward inclination of the shaft "aims" the shaft at the pilot's eyes when the aircaraft is in level flight.

Preferably, the pivot axis of bracket 170 is positioned immediately below universal-joint assembly 163 as shown in FIGS. 11—12. This places the two pivot axes of the universal joint (which has a center of action defined by the intersection of the pivot axes) and the bracket pivot axis in a common plane when the instrument is indicating a level pitch attitude, the common plane being normal to the axis of the roll gimbal, and cross-coupling error from the universal joint is thereby minimized.

Shafts 167 and 180 are rotatably coupled together by a pair of bevel gears 181 and 182. An end 183 of output shaft 180 is of reduced diameter and extends through slot 127 in horizon panel 126. An indicator 184 is rigidly secured to end 183 of the output shaft, and is positioned just forwardly of the horizon panel. Indicator 184 is shaped to simulate an aft view of an aircraft (see FIG. 14), and has a wing-simulating portion 184A and a rudder-simulating portion 184B. The indicator and gyro are coupled together in pitch and roll by a coupling means which comprises the Geneva mechanisms, yoke member 161 and the associated universal joint, pivoted bracket 170, gears 181 and 182, and output shaft 180.

A horizontal centerline 185 is marked on the horizon panel to define a pitch index or reference against which indicator 184 is viewed when the aircraft is in level flight. A series of vertically spaced pitch-reference lines 186 are positioned above and well below horizontal centerline 185. A series of radially extending roll-reference lines 187 are also marked on the horizon panel to provide an index against which the roll attitude of the aircraft may be determined.

In operation, instrument 120 is installed in an aircraft with the outer gimbal axis of rotation parallel to the aircraft roll axis, and the inner-gimbal axis of rotation parallel to the aircraft pitch axis when the aircraft is in level flight and the gyro axis of rotation is vertical. The gyro rotor is brought up to rotational speed by conventional pneumatic or electric means (not shown), and the gyro axis of rotation is erected to a vertical position with respect to the earth by an erecting means (not shown). The erecting means thereafter maintains the spin axis of the rotor in a vertical position, and the instrument case moves around this gyro-stabilized axis as the aircraft maneuvers in pitch and roll.

When the aircraft is in level flight, crankpin 145 is fully seated in slot 153 of crank-member inner arm 151 as shown in FIG. 15. With this orientation of the Geneva mechanism, indicator 184 is centered in window 129 and aligned with horizontal centerline 185 on the horizon panel. The instrument is also mounted so the wing-simulating portion of indicator 184 is horizontal when the aircraft is in a wings-level attitude.

If the aircraft now enters a wings-level climb, the aircraft, instrument case, and outer gimbal rotate around the inner-gimbal axis of rotation and the gyro-stabilized inner gimbal. The relative position of the outer and inner gimbals in a wings-level climbing attitude is shown in FIG. 16. The resulting relative rotational movement between the inner and outer gimbals causes inner arm 151 of the crank member 146 to slide along crankpin 145 such that the crank member is rotated about pivot pin 147. This rotation moves the lower end of outer arm 150 of the crank member rearwardly toward rear plate 123 of the case.

Yoke member 161 is also carried rearwardly toward rear plate 123 as it is pivotally secured to outer arm 150 by pivot pin 158. The rearward motion of the yoke member is transmitted through universal-joint assembly 163 to indicator-supporting bracket 170 which accordingly rotates about pivot pins 172 to move indicator 184 upwardly with respect to the horizon panel. The climbing attitude of the aircraft is thus immediately apparent to the pilot as the indicator is now positioned above horizontal centerline 185. The universal joint permits the yoke member and bracket 170 to move freely about their respective pivot axes, and prevents binding during rolling of the aircraft.

If the climb angle of the aircraft is constantly increased (as in performing an inside loop) the relative motion between the gyro inner and outer gimbals will drive inner arm 151 out of contact with pivot pin 147 as shown in FIG. 17, and no further rearward translation of outer arm 150 of the crank member will occur. At high pitch angles, the tapered end of inner arm 151 thus rides around the periphery of boss 143 without causing any translation of outer arm 150.

The Geneva mechanism is configured so the outer arm moves in response to pitch changes up to about ±35° from a level-flight position. In more extreme pitch attitudes, the crank member is in a dwell phase, and no further translation of the outer arm and yoke member 161 occurs. Indicator 184 is thus always visible through window 129 in even extreme pitch attitudes. In essence, the indicator appears to move upwardly or downwardly with respect to the horizon panel in substantially linear fashion in response to aircraft pitch changes up to about ±35° from a level-flight positions, and thereafter dwells in the "full-up" climb-limit or "full-down" dive-limit position with respect to the horizon panel. End 183 of output shaft 180 rests against the end of slot 127 in these extreme pitch attitudes.

If the aircraft is rolled away from a wings-level position, and assuming the aircraft is held level in pitch, both the inner and outer gimbals of the gyroscope are held horizontal in space and the instrument components secured to the case rotate around the outer-gimbal axis of rotation. Bevel gear 181 is stabilized in space as its rotational position is controlled by the outer gimbal. Bevel gear 182, however, rotates with the frame and case around gear 181, and output shaft 180 is thereby rotated. The rotation reversal provided by gears 181 and 182 insures that the output shaft and indicator 184 rotate in a direction corresponding to the actual direction of aircraft roll. For example, if the aircraft is rolled to the right, indicator 184 rotates clockwise (as viewed in FIG. 14) and the wing-simulating portion of the indicator indicates a right bank with respect to horizon-simulating centerline 185 and roll-reference lines 187.

Similarly, a left-banking motion of the aircraft produces a counterclockwise rotation of the indicator. Roll-and-pitch motions of the aircraft can of course occur simultaneously, and the indicator will faithfully track these motions by appearing to move with respect to the horizon panel. For example, if the aircraft enters a diving left turn, the indicator will appear to rotate counterclockwise (to display a left bank) and to move downwardly with respect to the horizon panel.

If the aircraft is flown in inverted flight, instrument 120 will still faithfully display to the pilot the aircraft attitude. This capability of the instrument can be explained in terms of its performance as the aircraft is flown through an inside loop. As the nose of the aircraft is raised in the early part of the loop, indicator 184 appears to rise with reference to horizon panel 126. When a nose-up attitude of about 35° is reached, crank member 146 becomes decoupled from crankpin 145 in the Geneva mechanism, and the indicator then remains stationary in a "full-up" position close to the top of window 129.

As the 90° point in the inside loop is approached and the aircraft is nearly in a vertical climbing attitude, vertical gyro 130 approaches a "gimbal lock" condition in which the rotor spin axis is nearly in alignment with the outer-gimbal axis of rotation. As the aircraft passes through the 90° point in the loop, the outer gimbal flips one-half revolution about its axis of rotation as explained below. This 180° rotation is transmitted through yoke member 161 and the other coupling components to indicator 184, and the indicator correspondingly flips into an inverted position in which the rudder-simulating portion extends toward the bottom of window 129.

As the aircraft continues through the loop to approximately the 145° point, indicator 184 begins to move downwardly from its "full-up" dwell position. At the top of the loop with the aircraft in level inverted flight, the indicator is centered in the window in alignment with horizontal centerline 185, and with the rudder-simulating portion of the indicator still pointing downwardly (toward the cockpit floor) in the window to indicate the inverted attitude of the aircraft. The inverted indicator then moves to the bottom of the window as the loop is continued, and stabilizes in a "full-down" dwell position at about a 215° point in the loop. The outer gimbal again approaches gimbal lock at the 270° point, and the outer gimbal flips one-half revolution to return the indicator to an upright position. As the aircraft is pulled out of the dive at the end of the loop, the indicator rises away from the full-down position and centers in the window as a normal level-flight attitude is reached.

The aforementioned half-rotation flip or reversal of the outer gimbal occurs automatically as the gyro approaches gimbal lock is the aircraft is at least slightly banked about the aircraft roll axis. This half-rotation would not occur, however, if a perfect passage through gimbal lock was made during the maneuver. To guard against this undesirable situation in which the inverted attitude of the aircraft would not be faithfully indicated by the instrument, a set of armlike stops 190 are provided on both sides of the inner gimbal.

Stops 190 are positioned to abut pins or projections 191 on the outer gimbal as the gyro comes within a few degrees of a gimbal-lock position in which the rotor spin axis would be aligned with the outer gimbal axis. When one of the stops contacts a projection 191, a perfect passage through gimbal lock is prevented and the resulting torque on the gyro results in a half-revolution of the outer gimbal. This arrangement of stops is further described in U.S. Pat. No. 2,452,473.

The same types of stops can be provided in instrument 10 to prevent a perfect passage through gimbal lock which would prevent the desired flip of the outer gimbal and also possibly result in a violent precession of the gyro. The operation of the stops in instrument 10, however, is somewhat different than in instrument 120 due to the different orientation of the gyroscope in the instrument case.

In instrument 10, the outer-gimbal axis of rotation is parallel to the pitch axis of the aircraft, and in instrument 120 the outer-gimbal axis is parallel to the aircraft roll axis. Thus in instrument 10, gimbal lock is approached as the aircraft approaches a 90° bank which would align the outer-gimbal axis with the rotor spin axis. Appropriate stops are positioned between the inner and outer gimbals to prevent a perfect passage through gimbal lock, and the outer gimbal flips one-half revolution in pitch when the stops become operative to block outer-gimbal motion toward gimbal lock. That is, as the aircraft rolls through a banking attitude of 90°, the outer gimbal rotates one-half revolution to reverse the positions of indicators 32A and 32B. The gimbal orientation in instrument 120 is preferred as gimbal lock is approached in pitch rather than in roll.

Most pilots prefer an attitude-indicating instrument which includes an adjustment for varying indicator position with respect to the horizontal centerline on the horizon panels when the instrument is in level flight. Some pilots may prefer to have the simulated-wing portion of the indicator exactly aligned with the horizontal centerline or simulated horizon line when the aircraft is in level flight, and others may prefer a position slightly above or below this line. A simple way to provide such an adjustment in instrument 120 is to mount the instrument case in the aircraft to be movable within a limited range about the aircraft pitch axis.

Such a movable mounting is easily provided in instrument 120 by hinging the instrument case to the aircraft instrument panel. For example, a hinged mounting means such as a mounting bracket 193 is secured to the top of shield 125 to be positioned behind the aircraft instrument panel. A bore 194 extends through the bracket parallel to the aircraft pitch axis. A shaft (not shown) is passed through the bore and secured to a mounting bracket (not shown) fastened to the aircraft instrument panel. The instrument case can thus rock within a limited range around the aircraft pitch axis to vary the position of horizontal centerline 185 with respect to the stabilized indicator.

A locking means such as an adjusting screw 195 passes through a slot 196 on the bottom of front plate 124 and has a pair of radially extending flanges 197 on opposite sides of the front plate such that axial movement of the screw with respect to the front plate is prevented. The end of the screw has a threaded portion 198 which is threaded through a nut 199. The nut has a pair of shafts or pins 200 extending from opposite sides thereof for pivotal mounting to a bracket (not shown) secured to the aircraft instrument panel. The nuts is thus mounted to rock slightly about the aircraft pitch axis as the screw is threaded in or out to rotate the instrument case around hinge-mounting bracket 193.

In each of the instruments described above, a "roll-stabilized" shaft or member is connected to the gyro to be isolated from motion of the aircraft and instrument about the aircraft roll axis. An output shaft carrying an indicator is connected to the roll-stabilized shaft by a roll-coupling means arranged to rotate the output shaft in the same direction with respect to the aircraft and instrument frame as the aircraft banks about its roll axis with respect to the earth. In the specific embodiments shown in the drawings, the roll-coupling means is a pair of gears which can be viewed as either epicyclic gears or simple rotation-reversing gears, depending on the frame of reference against which the rotation is observed and measured.

When the instrument is placed on a bench with a stationary rotor, the functioning of the roll-coupling means can be demonstrated by simply moving the roll-axis gimbal with respect to the frame. In this situation, the roll-coupling gears act as simple rotation-reversing gears which rotate the output shaft to an equal extent and in an opposite direction to the rotation of the gimbal. This is equivalent to using the instrument frame (and aircraft) as a frame of reference against which motion (actual motion on the bench, and apparent motion when in flight) of the roll-axis gimbal is measured.

Another approach is to analyze the instrument operation in terms of an inertial or earth reference. In this case, the roll-stabilized shaft is stationary with respect to earth because it is connected directly to the roll-axis gimbal. When the aircraft banks, the aircraft, instrument frame, and output shaft roll around the roll-stabilized shaft. The gear on the output shaft thus rolls around the stationary gear on the roll-stabilized shaft in epicyclic fashion. The gears are identical, and the output-shaft gear thus rotates in the same direction and to twice the extend that the aircraft banks around its roll axis.

If the aircraft banks 10° to the right, the horizon panel and fixed roll-reference lines also bank 10° to the right with respect to the earth. The indicator, however, rotates 20° to the right with respect to earth due to the epicyclic gearing, and accordingly displays a 10° bank when viewed with respect to the level-flight roll-reference line. The gears (or equivalent roll-coupling means) can thus be viewed as either epicyclic or simple one-to-one rotation-reversing gears, depending on the frame of reference which is used.

Pitch indication of the above-described instruments is most easily visualized by considering the indicator as an extension of the pitch-axis gimbal which is isolated from pitch movements of the aircraft. Instruments 10 and 50 in fact have a rigid connection (with respect to the pitch axis) between the pitch-axis gimbal and the indicator. Instrument 120 uses a lost-motion coupling which functions essentially as a rigid coupling for the portion of total pitch motion which is of greatest importance (i.e., pitch attitudes in the range of ±30° or 35° with respect to a level-flight attitude). Extreme pitch attitudes beyond this range are suppressed or isolated from the indicator by the nonlinear lost-motion linkage in order to provide continuous roll-attitude information to the pilot in even vertical dives or climbs.

Additional guidance information can be obtained from the above-described instruments by including other types of indicators visible through the instrument window. For example, glide-slope and localizer needles of the familiar ILS system can be added to the instrument. The localizer needle can also be driven by a conventional omnirange receiver to display deviations from a selected course. Similarly, a synchro-driven compass card operated from a remote directional gyro can be displayed adjacent the instrument horizon panel. These additional displays minimize the number of separate instruments which must be constantly scanned during instrument flight.

A novel attitude-indicating instrument has been described which presents attitude information to a pilot in a natural and easily interpreted manner. The concepts of the invention can be incorporated in other specific styles of attitude-indicating instruments, and all such variations are intended to be encompassed within the scope of the following claims which define the invention in detail.

What I claim is:

1. In an attitude-indicating instrument having a vertical gyro with pitch-and-roll gimbals supported on a frame adapted for mounting in an aircraft having pitch-and-roll axes, the improvement comprising:

first means on the gyro for converting pitch displacements of the pitch gimbal to a generally fore-and-aft motion with respect to the frame, the first means being stabilized in space by the gyro with respect to roll motion of the frame;

a member connected to the first means to be stabilized in space with respect to roll motion of the frame and to be movable in a generally fore-and-aft direction with respect to the frame in response to pitch displacements;

and an attitude indicator; and coupling means connected between the member and indicator, and including as components thereof:

a. a shaft secured to the indicator, b. means secured to the frame and shaft for mounting the shaft to be rotatable about its axis to display roll attitude on the indicator in response to roll movement of the frame with respect to the roll-stabilized member, and further for mounting the shaft to be movable about an axis which is fixed with respect to the frame and normal to the shaft axis to move the indicator up and down with respect to the frame to display pitch attitude, c. reversing means for effecting a reversal in rotational direction of the shaft with respect to a direction of apparent rotation of the gyro roll gimbal during aircraft roll maneuvers, and d. a universal joint to compensate for axial misalignment of the shaft with respect to the member as the shaft moves in response to pitch variations;

each of said coupling means components being effective in transmitting both pitch-and-roll position from the gyro to the indicator whereby splitting and subsequent recombination of pitch-and-roll position within the coupling means is avoided.

2. In an attitude-indicating instrument including a vertical gyro rotatably supported by a frame adapted for mounting in an aircraft having pitch-and-roll axes, the gyro having pitch-and-roll gimbals rotatable with respect to the frame around axes parallel to the respective pitch-and-roll axes of the aircraft, the gyro having a rotor spin axis which is gyro stabilized to be substantially vertical in space, the improvement comprising;

a horizon panel supported on the frame and defining a simulated horizon line which is stationary with respect to the frame and aircraft during aircraft maneuvering;

an indicator disposed adjacent the horizon panel for displaying with reference to the horizon line the actual aircraft pitch-and-roll attitude with respect to earth;

first means on the roll gimbal and connected to the pitch gimbal for converting relative movement of the gimbals during pitch maneuvers to a fore-and-aft motion with respect to the frame;

a member connected to the first means to be movable thereby in a generally fore-and-aft direction with respect to the frame in response to aircraft pitch movement, and to be rotatable with the roll gimbal as the roll gimbal rotates with respect to the frame during aircraft roll movement;

second means for supporting and driving the indicator, including a bracket pivotally secured to the frame to be movable about an axis which is fixed with respect to the frame and parallel to the horizon line, an input shaft rotatably mounted on the bracket, an output shaft rotatably mounted on the bracket, the indicator being attached to the output shaft, and a rotation-reversing means connected in driving relation between the input and output shafts to effect a rotation reversal therebetween; and a universal joint connected between the member and input shaft for correcting misalignment therebetween during pitch maneuvers;

whereby rotations of both the pitch and roll gimbals with respect to the frame are transmitted through the member, universal joint, and input and output shafts to rotate the indicator in a direction corresponding to roll movement of the aircraft, and to move the indicator above and below the simulated horizon line in a direction corresponding to pitch movement of the aircraft.

3. The improvement defined in claim 2 in which the universal joint has a center of action which, when the instrument is in a level pitch attitude, lies substantially in a plane containing the bracket axis and normal to the axis of the roll gimbal.

4. The improvement defined in claim 2 in which the first means includes a lost-motion linkage arranged to move the member fore-and-aft for a limited range of deviations from a horizontal pitch attitude, and to maintain the member in a substantially stationary fore-and-aft position for pitch attitudes beyond the limited range whereby indicator pitch movement is maximized for aircraft pitch attitudes close to a horizontal attitude, and the indicator is substantially stationary at pitch limit positions during extreme pitch attitudes so roll attitude can be continuously monitored.

5. The improvement defined in claim 4 in which the roll gimbal is an outer gimbal, the member being shaped as a yoke with arms extending on opposite sides of the roll gimbal for attachment to the first means, the roll gimbal being rotatably supported on the frame by a single shaft remote from the member whereby the outer gimbal can rotate continuously with respect to the frame without interfering with the member to drive the indicator through a full range of possible pitch attitudes; and in which the rotation-reversing means is a pair of gears attached to the respective shafts; the universal joint having a center of action which, when the instrument is in a level pitch attitude, lies substantially in a plane containing the bracket axis and normal to the axis of the roll gimbal.

PO-1050
(5/69)

UNITED STATES PATENT OFFICE
CERTIFICATE OF CORRECTION

Patent No. 3,589,019          Dated June 29, 1971

Inventor(s) Irven H. Culver

It is certified that error appears in the above-identified patent and that said Letters Patent are hereby corrected as shown below:

Column 1, line 42, insert --A means is provided on the gyro for converting pitch displacements of the pitch gimbal to a generally fore-and-aft motion with respect to the frame. A yoke-shaped member is connected to this means to be stabilized in space by the pitch gimbal with respect to roll motion of the frame, and to be movable in a generally fore-and-aft direction with respect to the frame in response to pitch movement of the aircraft. A coupling means is connected between the member and indicator, and includes an output shaft secured to the indicator and carried by a bracket which is pivotally secured to the frame to be movable about an axis fixed with respect to the frame and parallel to the horizon-panel reference line. An input shaft is also rotatably mounted on the bracket, and is coupled to the output shaft by rotation-reversing gears. A universal joint connects the yoke-shaped member and the input shaft. Rotations of the pitch and roll gimbals with respect to the frame are thus transmitted through the yoke-shaped member, universal joint, and input and output shafts to rotate and displace the indicator in directions corresponding to actual aircraft movement with respect to earth.--

Column 7, line 2, "on" should read -- in --; lines 68 and 69 "aircaraft" should read -- aircraft --. Column 8, line 20, after "and" delete "well". Column 9, line 10, "positions" should read -- position --; line 11, after "in" "the" should read -- a --. Column 10, line 5, after "lock" "is" should read -- if --; line 68, after "196" "on" should read -- in --. Column 11, line 37, "extend" should read -- extent --.

Signed and sealed this 14th day of March 1972.

(SEAL)
Attest:

EDWARD M. FLETCHER, JR.
Attesting Officer

ROBERT GOTTSCHALK
Commissioner of Patents